United States Patent
Wilson

(10) Patent No.: US 7,600,102 B2
(45) Date of Patent: Oct. 6, 2009

(54) CONDITION BITS FOR CONTROLLING BRANCH PROCESSING

(75) Inventor: Sophie Wilson, Cambridge (GB)

(73) Assignee: Broadcom Corporation, Irvine, CA (US)

(*) Notice: Subject to any disclaimer, the term of this patent is extended or adjusted under 35 U.S.C. 154(b) by 6 days.

(21) Appl. No.: 10/984,877

(22) Filed: Nov. 10, 2004

(65) Prior Publication Data

US 2005/0278514 A1   Dec. 15, 2005

Related U.S. Application Data

(60) Provisional application No. 60/578,901, filed on Jun. 14, 2004.

(51) Int. Cl.
*G06F 9/00*   (2006.01)

(52) U.S. Cl. ........................ 712/234; 712/239

(58) Field of Classification Search ................ 712/239, 712/240, 241, 234
See application file for complete search history.

(56) References Cited

U.S. PATENT DOCUMENTS

| | | | | |
|---|---|---|---|---|
| 5,394,529 A | * | 2/1995 | Brown et al. | 712/240 |
| 5,706,490 A | * | 1/1998 | Beard et al. | 712/234 |
| 6,035,390 A | * | 3/2000 | Burns et al. | 712/220 |
| 6,513,109 B1 | * | 1/2003 | Gschwind et al. | 712/200 |
| 6,918,030 B2 | * | 7/2005 | Johnson | 712/225 |
| 6,981,131 B2 | * | 12/2005 | Devereux | 712/219 |
| 6,986,025 B2 | * | 1/2006 | Wilson | 712/226 |

OTHER PUBLICATIONS

Bharadwaj et al, "The Intel IA-64 Compiler Code Generator," Sep.-Oct. 2000, IEEE Micro's Magazine.*
"Intel Itanium Processor Product Brief," 2001, Intel.*
"Intel Itanium Processor Reference Manual for Software Development," Dec. 2001, Intel, Revision 2.0.*

* cited by examiner

*Primary Examiner*—Alford W Kindred
*Assistant Examiner*—Benjamin P Geib
(74) *Attorney, Agent, or Firm*—Sterne, Kessler, Goldstein & Fox PLLC

(57) ABSTRACT

A processing pipeline with a plurality of pipeline stages is described, with the processing pipeline comprising a front end and a back end. The processing pipeline's front end comprises an array for storing at least two condition bits, the condition bits being adapted for indicating respective conditions. The front end is adapted for resolving conditional branch instructions by accessing the array of condition bits whenever a conditional branch instruction occurs, the respective branch instruction being resolved in accordance with a corresponding condition bit. In another embodiment, the condition bits are combined with predicated execution of instructions, with the instruction's predicates being evaluated at the processing pipeline's back end.

21 Claims, 1 Drawing Sheet

CONDITION BITS FOR CONTROLLING BRANCH PROCESSING

CROSS REFERENCE TO RELATED APPLICATIONS

This application claims priority from U.S. provisional application No. 60/578,901 filed on Jun. 14, 2004 by Sophie WILSON and entitled "Condition Bits For Controlling Branch Processing," which is incorporated by reference herein in its entirety.

BACKGROUND OF THE INVENTION

1. Field of the Invention

The invention relates to a processing pipeline, to a processing unit comprising at least one processing pipeline, and to an instruction set for a processing unit. The invention further relates to a method for implementing conditional execution of instructions.

2. Background of the Invention

There exist a variety of different techniques how a conditional execution of instructions can be performed. Often, some kind of branch prediction is employed. In case the outcome of a conditional branch has been mispredicted, instructions have to be reloaded from the instruction cache, in order to correct the instruction stream. As a consequence, several clock cycles are lost.

SUMMARY OF THE INVENTION

The present invention provides a processing pipeline with a plurality of pipeline stages comprising a front end and a back end, with the processing pipeline's front end comprising an array for storing at least two condition bits, said condition bits being adapted for indicating respective conditions, wherein the front end is adapted for resolving conditional branch instructions by accessing said array of condition bits whenever a conditional branch instruction occurs, the respective branch instruction being resolved in accordance with a corresponding condition bit.

In one variant, the condition bits are adapted for being accessed independently and indicate conditions that are set in dependence on the outcome of different tests.

In one variant, the pipeline stages comprise one or more of the following stages: at least one fetch stage, at least one decode stage, at least one rename stage, at least one issue stage, at least one execute stage, at least one complete stage.

In another variant, the processing pipeline is adapted for at least one of issuing, processing and completing instructions out-of-order.

In another variant, the pipeline is a deep pipeline comprising three or more intermediate pipeline stages arranged between the one or more fetch stages and the one or more execute stages.

In another variant, the pipeline's front end further comprises a program counter.

In another aspect, the array of condition bits is accessed by compare instructions, said compare instructions being adapted for evaluating a respective condition and for setting a corresponding condition bit according to said evaluation.

In yet another aspect, the pipeline further comprises a scoreboard with at least one scoreboard bit per condition bit, with each scoreboard bit indicating whether the corresponding condition bit is valid or whether the corresponding condition bit is in the process of being updated.

In another aspect, whenever a compare instruction adapted for evaluating a respective condition and for setting a corresponding condition bit has been completed at the processing pipeline's back end, the respective condition bit is set according to said evaluation.

In another variant, whenever a compare instruction adapted for evaluating a respective condition and for setting a corresponding condition bit has been completed at the processing pipeline's back end, an update message is sent from the back end to the front end of the processing pipeline.

In yet a further variant, said update message is adapted for setting a corresponding scoreboard bit to valid as soon as the respective condition bit has been set in accordance with the outcome of the compare instruction.

In another variant, the processing pipeline's back end is adapted for handling predicated instructions.

In yet another aspect, the processing pipeline's back end further comprises a bank of predicate registers.

In a further aspect, the predicated instructions further comprise address identifiers adapted for identifying one of the predicate registers.

In another variant, separate renaming policies are employed with regard to the condition bits at the front end and the predicate registers at the back end.

In one variant, the processing pipeline's back end is adapted for selectively carrying out a predicated instruction in dependence on at least one corresponding predicate bit being set or not.

In another variant, the processing pipeline's back end is adapted for checking a test condition of a predicated instruction against a condition code, and for selectively carrying out the predicated instruction in dependence on whether the condition code satisfies the test condition.

In one variant, the pipeline is adapted for performing laned SIMD conditional execution.

In a further aspect, the predicated instructions are adapted for operating on packed operands, the packed operands containing a plurality of packed objects in respective lanes.

In one variant, the processing pipeline's back end is adapted for evaluating predicates of a predicated instruction for each lane of an operand, and for selectively carrying out the operation in dependence on at least one corresponding predicate bit being set or not.

In a further variant, the processing pipeline's back end is adapted for checking a test condition of a predicated instruction against a condition code set for each lane of an operand, and for selectively carrying out the operation only in those lanes for which the condition code satisfies the test condition.

In another variant, the pipeline is adapted for performing SIMD array execution.

The present invention further provides a processing pipeline with a plurality of pipeline stages comprising a front end and a back end, with the processing pipeline's front end comprising an array for storing at least two condition bits, said condition bits being adapted for indicating respective conditions, wherein the front end is adapted for resolving conditional branch instructions by accessing said array of condition bits whenever a conditional branch instruction occurs, the respective branch instruction being resolved in accordance with a corresponding condition bit, and with the processing pipeline's back end being adapted for handling predicated instructions.

Furthermore, the present invention provides a processing unit comprising at least one processing pipeline as described above.

The present invention further provides an instruction set for a processing unit, said instruction set comprising both conditional branches and predicated instructions, wherein the conditional branches are adapted for being resolved at the front end in dependence on condition bits stored in an array of condition bits, and wherein predicated instructions are adapted for being handled at the pipeline's back end in accordance with their predicates.

In one variant, the instruction set further comprises at least one instruction adapted for modifying a predicate register kept at the processing pipeline's back end.

In another variant, the instruction set further comprises at least one instruction adapted for modifying a condition bit kept at the processing pipeline's front end.

In yet another variant, the instruction set further comprises at least one instruction adapted for modifying the content of a general register.

The present invention further provides a method for implementing conditional execution of instructions of an instruction set, the instruction set comprising both conditional branches and predicated instructions, the method comprising the steps of resolving conditional branches at the front end by accessing condition bits stored in an array of condition bits, of evaluating predicates of predicated instructions at the pipeline's back end, and handling the predicated instructions in accordance with the predicates.

In yet a further variant, the invention provides a software program or product, preferably stored on a data carrier, for executing the method described herein when the computer program product is executed on a computer, processing unit, digital signal processor, or the like.

It is appreciated that these and other aspects of the invention will become apparent to those skilled in the art in the detailed description and drawings contained herein.

DETAILED DESCRIPTION

Figure 1:
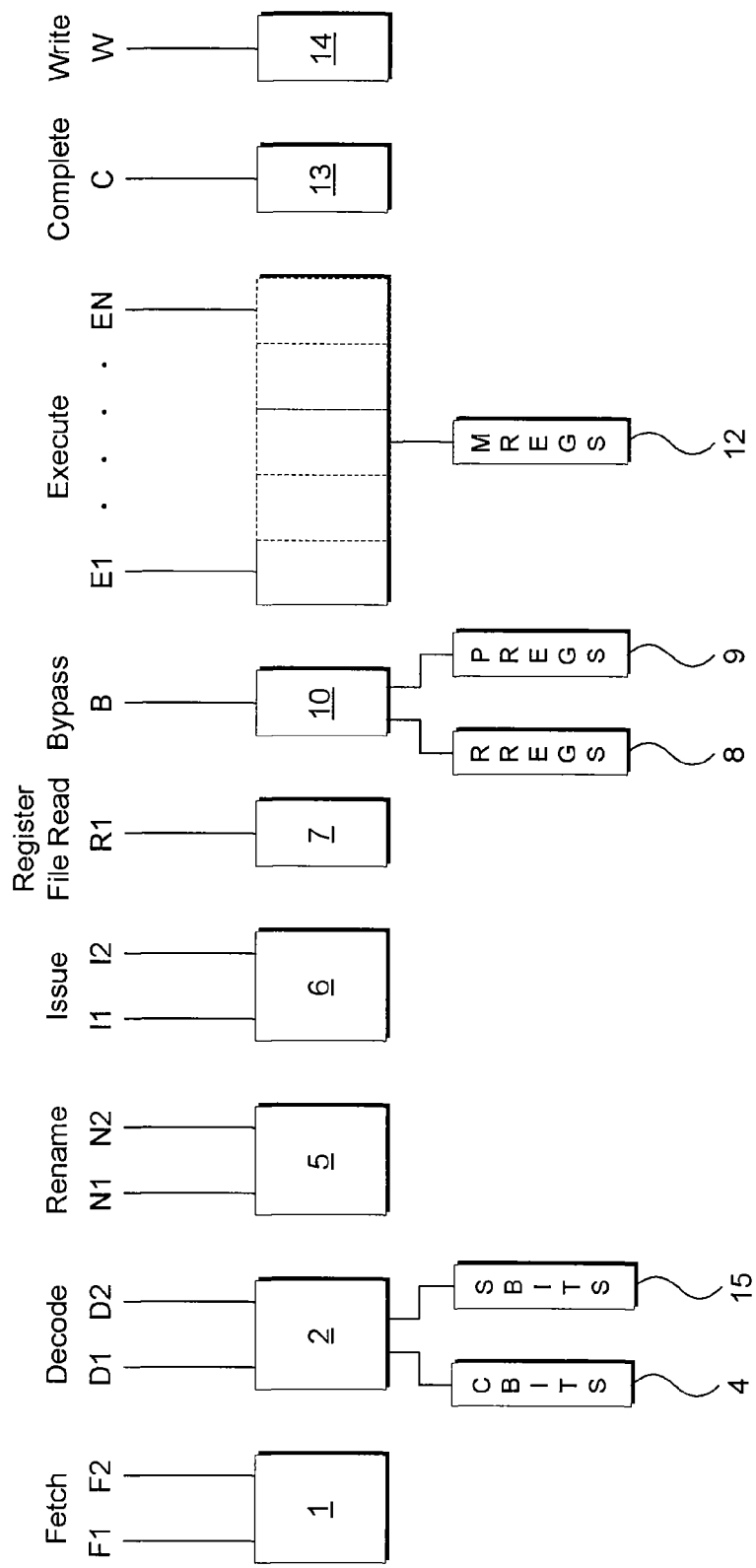
FIG. 1 shows a pipeline of a processing unit, the pipeline comprising a multitude of pipeline stages.

The invention provides a processing pipeline with a plurality of pipeline stages comprising a front end and a back end, with the processing pipeline's front end comprising an array for storing at least two condition bits, said condition bits being adapted for indicating respective conditions, wherein the front end is adapted for resolving conditional branch instructions by accessing said array of condition bits whenever a conditional branch instruction occurs, the respective branch instruction being resolved in accordance with a corresponding condition bit.

After a condition has been evaluated, a corresponding condition bit is set in accordance with the outcome of the evaluation. Later on, conditional branches that depend on this condition can access the condition bit. In dependence on the condition bit, the conditional branch is either taken or not taken.

According to embodiments of the present invention, the array of condition bits comprises two or more condition bits. Multiple condition bits allow the compiler to keep different values in them—C0 could be "a>b" while C1 still holds the value of "c<=d". Thus, the condition in C1 does not have to be overwritten when C0 is evaluated. Subsequent conditional branches can be resolved in dependence on any one of the condition bits. Generally, the compiler is responsible for assigning condition bits, for keeping track of the conditions stored in the condition bits, and for reassigning condition bits. The compiler may manage the condition bits as it manages ordinary registers and predicate registers.

According to the approach of the present invention, branches are resolved as early as possible. Conditional branches are resolved at the pipeline's front end. Therefore, speculative execution of conditional branches is not required. Accordingly, branch prediction hardware is not necessary. By resolving branches at the front end instead of predicting their outcome, pipeline stalls are avoided. In general, resolving branches at an early stage makes more sense than implementing complex branch prediction hardware.

Preferably, the array of condition bits is placed at the pipeline's front end. One might of course keep the condition bits in one or more general purpose registers, which are usually kept at the pipeline's back end. However, by keeping the array of condition bits at the front end, the latency for accessing the condition bits to resolve a branch is reduced. Furthermore, no extra read port for a general register array is required. It is therefore advantageous to place the array of condition bits at the pipeline's front end.

Preferably, the condition bits are adapted for being accessed independently and indicate conditions that are set in dependence on the outcome of different tests. For example, the front end might comprise a multitude of condition bits which represent a variety of different conditions, and which may be separately accessed by subsequent branches.

Preferably, the pipeline stages comprise one or more of the following stages: at least one fetch stage, at least one decode stage, at least one rename stage, at least one issue stage, at least one execute stage, at least one complete stage. After instructions have been fetched from the memory, they might e.g. be stored in an instruction buffer before they are passed to the decode stage(s) and the rename stage(s). Next, the instructions are issued and processed by one or more execute stages, whereby the instructions may either be issued in order or out-of-order.

In a preferred embodiment, the processing pipeline is adapted for at least one of issuing, processing and completing instructions out-of-order. In out-of-order processing, the order of issuing the instructions does not necessarily correspond to the instructions' sequential order in the instruction stream. Data integrity can be preserved by renaming the registers accordingly. Processing resources are used more efficiently by processing instructions out-of-order.

Further preferably, the pipeline is a deep pipeline comprising three or more intermediate pipeline stages arranged between the one or more fetch stages and the one or more execute stages. In pipelines of the prior art, some kind of branch prediction has been employed. However, at the pipeline's back end, it might turn out that the branch has not been predicted correctly. For example, a branch might be predicted as being "taken" whereas it is not taken, or vice versa. In these cases, the instruction stream has to be reloaded starting at this branch. As a consequence, a break in the pipeline occurs. The deeper the pipeline, the more cycles will be lost. According to embodiments of the present invention, branches are resolved right at the pipeline's front end. Accordingly, there are no pipeline stalls any more. This approach is particularly beneficial for deep pipelines comprising a lot of stages. As a consequence, the pipeline's performance is improved.

In a preferred embodiment, the pipeline's front end further comprises a program counter. The program counter allows to keep track of the sequence of instructions. Whenever a conditional branch is "taken", a new count value is written to the program counter. In embodiments of this invention, conditional branches are resolved at the pipeline's front end. In order to reduce the latency, the program counter is preferably kept at the pipeline's front end as well.

Preferably, the array of condition bits is accessed by compare instructions, said compare instructions being adapted for evaluating a respective condition and for setting a corresponding condition bit according to said evaluation. A compare instruction allows to evaluate a specific condition, which might either be fulfilled ("true") or not ("false"). After a compare instruction has been processed, a respective condition bit is updated in accordance with the outcome of the compare instruction, and subsequent branch instructions may refer to this condition bit. For example, if a condition bit is set, a subsequent branch that depends on this condition bit might be taken.

The interrelationship between a condition, a condition bit and a subsequent conditional branch instruction is managed by the compiler. The compiler is responsible for assigning a condition bit whenever a compare instruction occurs, and for keeping track of the life cycle of the condition bits. Whenever a condition will not be used any more, the compiler may reassign the corresponding condition bit. By shifting the task of administration and management of condition bits to the compiler, the hardware can be kept simple, cheap and small.

In a preferred embodiment, the pipeline further comprises a scoreboard with at least one scoreboard bit per condition bit, with each scoreboard bit indicating whether the corresponding condition bit is valid or whether the corresponding condition bit is in the process of being updated. When a compare instruction enters the pipeline, a corresponding condition bit will be updated. However, the result of evaluating the condition is not available before execution of the compare instruction has been completed. In the meantime, the condition bit must not be accessed by any other instruction. According to this embodiment, a scoreboard bit is provided for each condition bit, with said scoreboard bit indicating whether the corresponding condition bit is in the process of being updated, or whether the condition bit is valid. As long as the compare instruction and the corresponding condition bit are in the process of being evaluated, the condition bit is interlocked.

Preferably, whenever a compare instruction adapted for evaluating a respective condition and for setting a corresponding condition bit has been completed at the processing pipeline's back end, the respective condition bit is set according to said evaluation.

Further preferably, whenever a compare instruction adapted for evaluating a respective condition and for setting a corresponding condition bit has been completed at the processing pipeline's back end, an update message is sent from the back end to the front end of the processing pipeline. Further preferably, an asynchronous update message is used for updating a respective condition bit.

Preferably, said update message is adapted for setting a corresponding scoreboard bit to valid as soon as the respective condition bit has been set in accordance with the outcome of the compare instruction.

In a preferred embodiment of the invention, the processing pipeline's back end is adapted for handling predicated instructions. Predicated instructions provide another way of implementing conditional execution. In dependence on an instruction's predicate, the predicated instruction is either executed or not. It is much easier to process predicated instructions than to handle conditional branches, because there are no jumps in the instruction stream. The predicated instructions can be processed smoothly in sequential order. Therefore, the compiler is adapted for utilizing predicated instructions instead of conditional branches whenever this is possible. In fact, a lot of conditional branches can be replaced by predicated instructions. Hence, the number of conditional branches in the instruction stream is reduced. According to embodiments of the present invention, the remaining conditional branches are resolved by means of condition bits at the pipeline's front end. The use of condition bits at the pipeline's front end is combined with predicated execution of instructions at the back end. The aim of this embodiment is to use the best mechanism for each purpose rather than trying to do everything with a single mechanism.

Further preferably, the processing pipeline's back end further comprises a bank of predicate registers. For example, a predicated instructions might refer to one of the predicate registers, whereby the predicate for the respective instruction is contained in the identified predicate register.

In a further preferred embodiment, the predicated instructions further comprise address identifiers adapted for identifying one of the predicate registers. For example, a few bits of the predicated instruction might be used for accommodating an address identifier, whereas the predicate itself is kept in a predicate register.

In a preferred embodiment, separate renaming policies are employed with regard to the condition bits at the front end and the predicate registers at the back end. Renaming of condition bits and predicate registers is now separate—for example, one might prefer not to rename the condition bits and to rename the predicate registers—and thus can proceed in parallel with smaller renamers if required.

According to a preferred embodiment, the processing pipeline's back end is adapted for selectively carrying out a predicated instruction in dependence on at least one corresponding predicate bit being set or not. In this embodiment, execution of a predicated instruction is controlled by corresponding predicate bits that are either set or not set. Said condition bits might e.g. be stored in a predicate register. If the one or more predicate bits are set, the predicated instruction will be executed. Otherwise the predicated instruction will be ignored.

According to an alternatively preferred embodiment, the processing pipeline's back end is adapted for checking a test condition of a predicated instruction against a condition code, and for selectively carrying out the predicated instruction in dependence on whether the condition code satisfies the test condition. According to this alternative embodiment, a respective predicate is compared with a condition code, and the outcome of this comparison determines whether the predicated instruction will be executed or not. This embodiment is well-suited for handling complex conditions. The condition code might e.g. comprise a multitude of different flags, like e.g. a negative flag, a zero flag, a carry flag, an overflow flag, etc. A multibit condition code allows to check the predicate in various different ways, whereby several different flags can be checked in one pass. A predicated instruction might then be executed in dependence on a certain combination of the values of these flags.

Preferably, the pipeline is adapted for performing laned SIMD conditional execution. Predicated execution is well-suited for laned SIMD (Single Instruction Multiple Data) conditional execution. A laned SIMD instruction may process a plurality of operands in parallel. Due to this parallelism, laned SIMD conditional execution allows for high throughput instruction processing.

In a further preferred embodiment, the predicated instructions are adapted for operating on packed operands, the packed operands containing a plurality of packed objects in respective lanes.

According to a further preferred embodiment, the processing pipeline's back end is adapted for evaluating predicates of a predicated instruction for each lane of an operand, and for selectively carrying out the operation in dependence on at least one predicate bit for a respective lane being set or not. For each of the lanes, a respective operand is processed in dependence on whether at least one corresponding predicate bit is set or not. If the at least one predicate bit for a respective lane is set, the predicated instruction will operate on the operand in said lane. If the at least one predicate bit for a respective lane is not set, the predicated instruction will not operate on the operand in said lane. Operands in several lanes can be subjected to conditional execution in parallel.

According to an alternatively preferred embodiment, the processing pipeline's back end is adapted for checking a test condition of a predicated instruction against a condition code set for each lane of an operand, and for selectively carrying out the operation only in those lanes for which the condition code satisfies the test condition. For each of the lanes, the predicate of the respective operand is compared with a condition code. In case of a match, the operand in the respective lane is processed. In case of a mismatch, the operand in the respective lane is not processed. Further preferably, the condition codes are set on a lane-by-lane basis.

According to a preferred embodiment, the pipeline is adapted for performing SIMD array execution. In SIMD array execution, one instruction is distributed to a multitude of different execution units, in order to operate on several operands in parallel.

Furthermore, the invention relates to a processing pipeline with a plurality of pipeline stages comprising a front end and a back end, with the processing pipeline's front end comprising an array for storing at least two condition bits, said condition bits being adapted for indicating respective conditions, wherein the front end is adapted for resolving conditional branch instructions by accessing said array of condition bits whenever a conditional branch instruction occurs, the respective branch instruction being resolved in accordance with a corresponding condition bit, and with the processing pipeline's back end being adapted for handling predicated instructions.

By resolving conditional branches at the pipeline's front end, the effect of pipeline breaks in deep pipelines are mitigated without using such large features as branch prediction units. Effectively, a processing pipeline according to embodiments of the present invention provides a very shallow pipeline for branch execution while keeping a deep pipeline for instruction execution. It also provides predication within the deep pipeline as a way of reducing the need for branches in the first place.

The present invention provides a processing unit comprising at least one processing pipeline as described above.

Furthermore, the invention relates to an instruction set for a processing unit, said instruction set comprising both conditional branches and predicated instructions, wherein the conditional branches are adapted for being resolved at the front end in dependence on condition bits stored in an array of condition bits, and wherein predicated instructions are adapted for being handled at the pipeline's back end in accordance with their predicates.

Preferably, the instruction set comprises at least one instruction adapted for modifying a predicate register kept at the processing pipeline's back end.

Further preferably, the instruction set comprises at least one instruction adapted for modifying a condition bit kept at the processing pipeline's front end.

In another variant, the instruction set comprises at least one instruction adapted for modifying the content of a general register.

The invention further provides a method for implementing conditional execution of instructions of an instruction set, the instruction set comprising both conditional branches and predicated instructions, the method comprising the steps of resolving conditional branches at the front end by accessing condition bits stored in an array of condition bits, and of evaluating predicates of predicated instructions at the pipeline's back end, and handling the predicated instructions in accordance with the predicates.

In FIG. 1, an implementation of a processing pipeline according to the present invention is shown. The pipeline comprises two fetch stages F1 and F2, two decode stages D1 and D2, two rename stages N1 and N2, and two issue stages I1 and I2. The pipeline further comprises a register read stage R1, a bypass stage B, N different execute stages E1, E2, ... EN, a complete stage C and a write stage W.

Instructions that have been fetched from a memory are stored in an instruction cache 1. Next, the instructions are forwarded to the pipeline's front end 2, which comprises an array 4 of condition bits CBITS. According to embodiments of the present invention, branches are resolved as early as possible. Therefore, conditional branches are resolved at the pipeline's front end 2. By resolving branches at the pipeline's front end, it is not necessary to implement features like branch prediction or branch target caches.

The instruction set comprises instructions adapted for evaluating whether a certain condition is true or false, and for either setting or resetting a corresponding condition bit. The CMPC instruction is an example of an instruction that permits to evaluate a given condition. The compare instruction CMPC is adapted for determining whether a certain condition is fulfilled ("true") or not ("false"). For example, a compare instruction CMPC might e.g. evaluate if the condition a>b is true or not. The result of this evaluation is written to one of the condition bits CBITS. As soon as execution of the respective CMPC instruction has been completed and the corresponding condition bit has either been set or not, a subsequent conditional branch that depends on the respective condition can be resolved. The conditional branch accesses the condition bit. Depending on the value of the condition bit, the branch will either be taken or not.

In a preferred embodiment, the program counter PC, which is responsible for identifying the instructions of the instruction stream, is implemented at the pipeline's front end 2 as well. Whenever a branch is taken, the program counter PC has to be set to a new value. In order to minimize latency, it is advantageous to place the program counter PC at the front end 2.

In addition to branch resolution, the front end 2 might be adapted for processing loop instructions, whereby the loop's iterations are considered when forwarding the instruction stream to the pipeline.

According to the invention, the front end 2 is equipped with an array 4 of condition bits comprising two or more condition bits. Each of the condition bits CBITS of the array 4 can be assigned to a certain condition. Thus, it is possible to simultaneously keep track of different conditions. Subsequent branch instructions may refer to any one of the conditions. By providing two or more condition bits, it is no longer necessary to overwrite a first condition as soon as a second condition becomes relevant, and branch instructions might depend on any one of these conditions. In general, the burden of keeping track of the condition bits and the conditions they represent can be shifted to the compiler, whereas the hardware can be kept simple, cheap and small. The compiler may manage condition bits in the same way as it manages ordinary registers.

Compare instructions CPMC are well-suited for evaluating conditions, and for setting a corresponding condition bit in dependence on the outcome of this evaluation. However, when a compare instruction is provided to the processing pipeline, it takes a certain number of clock cycles until the result of the compare instruction is available. During this time interval, the corresponding condition bit is not valid and has to be interlocked. This can be accomplished by means of a scoreboard comprising at least one scoreboard bit per condition bit. The time interval required for processing a compare instruction has to be considered by the compiler. FIG. 1 illustrates a scoreboard 15 comprising scoreboard bits SBITS. In an embodiment, there is at least one SBIT per CBIT. In a preferred embodiment, the compiler is responsible for inserting a sufficient number of other instructions between a compare instruction and a related conditional branch. Hence, a compiler-managed latency scheme is established.

The pipeline shown in FIG. 1 further comprises a rename unit 5, an issue unit 6, and a main register read unit 7. The main register read unit 7 at the pipeline's back end is responsible for accessing registers and for fetching operands required for executing a certain instruction. For this purpose, the main register read unit 7 is connected with a bank 8 of registers RREGS. Furthermore, the main register read unit 7 is connected with a bank 9 of predicate registers PREGS. After the required operands have been obtained, the instruction is forwarded to the bypass unit 10 and to the execute unit 11. In the embodiment shown in FIG. 1, the execute unit 10 comprises N different execute stages E1, E2, ... EN. The execute unit 10 is connected to a bank 12 of registers MREGS. After an instruction has been executed, the instruction is forwarded to the complete unit 13 and to the write unit 14.

In addition to condition bits, which are used for resolving conditional branches at the pipeline's front end, the processing pipeline shown in FIG. 1 uses predicated execution as a second mechanism for handling conditional execution. Predicated execution means that execution of an instruction is predicated on some value identified or addressed in the instruction. In dependence on the predicate, the instruction is either executed or not.

A lot of conditional branches can be replaced by one or more predicated instructions, i.e. by instructions that are executed in dependence on their respective predicate. Implementing predicated execution allows to reduce the overall number of conditional branches. Thus, by combining different schemes for handling conditional execution, in particular by combining condition bits and predicated execution, each conditionality can be taken care of by the most appropriate scheme. The aim of the invention is to use the best mechanism for each purpose rather than trying to do everything with a single mechanism.

According to a first embodiment, the predicate registers PREGS of the bank 9 contain predicates comprising one or more predicate bits. If the predicate bits for a predicated instruction are set, the respective instruction will be executed. Otherwise, the predicated instruction will be ignored.

In an alternative embodiment, the predicate registers PREGS of the bank 9 may contain a test condition to be checked against at least one condition code in a set of condition codes to determine whether or not the instruction is to be executed. In case of a match, the predicated instruction is executed. Otherwise, the predicated instruction is not executed.

Predicated instructions are well-suited for laned SIMD (Single Instruction Multiple Data) conditional execution. Predicated instruction might operate on so-called packed operands, each of which contain a plurality of packed objects in respective lanes.

The degree of packing of objects for packed data processing operations might e.g. be defined according to the following scheme:

(B) Bytes, 8 bit objects ($b_0 \ldots b_7$)
(H) Halfwords, 16 bit objects ($h_0 \ldots h_3$)
(W) Words, 32 bit objects ($w_0, w_1$)
(L) Longword, 64 bit object (I)
(S) 32 bit floating point
(D) 64 bit floating point For example, if 16-bit objects (halfwords) are used, a predicated instruction might simultaneously operate on 4 lanes.

According to one embodiment, the predicates stored in the predicate registers comprise predicate bits that control conditional execution of a predicated instruction. For each lane, there exist corresponding predicate bits. In dependence on the predicate bits for a certain lane, the predicated instruction might either operate on the operand of the respective lane or not. If the at least one predicate bit for a certain lane is set, the operand in the respective lane will be processed. If the at least one predicate bit for a respective lane is not set, the operand won't be processed.

According to another embodiment, conditional execution of predicated instructions comprises checking a test condition against a condition code set for each lane of the operand and carrying out the operation only in those lanes for which the condition code satisfies the test condition. In this embodiment, the predicate registers are adapted for storing test conditions.

In embodiments of the present invention, the advantages of conditional SIMD execution can be combined with condition bits that are used to control branch processing at the pipeline's front end.

I claim:

1. A processing pipeline with a plurality of pipeline stages, the processing pipeline comprising:
   a front end comprising logic configured to resolve conditional branch instructions by accessing an array of condition bits whenever a conditional branch instruction occurs, the respective branch instruction being resolved in accordance with a corresponding condition bit;
   a scoreboard having at least one scoreboard bit per condition bit, wherein each scoreboard bit is configured to indicate whether a corresponding condition bit is valid or whether a corresponding condition bit is in the process of being up-dated; and
   a back end comprising logic configured to handle predicated instructions.

2. The processing pipeline of claim 1, wherein the condition bits are adapted for being accessed independently and indicate conditions that are set in dependence on the outcome of different tests.

3. The processing pipeline of claim 1, wherein the pipeline stages comprise one or more of the following stages: at least one fetch stage, at least one decode stage, at least one rename stage, at least one issue stage, at least one execute stage, at least one complete stage.

4. The processing pipeline of claim 1, said processing pipeline being adapted for at least one of issuing, processing and completing instructions out-of-order.

5. The processing pipeline of claim 1, wherein the pipeline is a deep pipe-line comprising three or more intermediate pipeline stages arranged between one or more fetch stages and one or more execute stages.

6. The processing pipeline of claim 1, wherein the front end further comprises a program counter.

7. The processing pipeline of claim 1, wherein the array of condition bits is accessed by compare instructions, said compare instructions being adapted for evaluating a respective condition and for setting a corresponding condition bit according to said evaluation.

8. The processing pipeline of claim 1, wherein, whenever a compare instruction adapted for evaluating a respective condition and for setting a corresponding condition bit has been completed at the back end, the respective condition bit is set according to said evaluation.

9. The processing pipeline of claim 1, wherein, whenever a compare instruction adapted for evaluating a respective condition and for setting a corresponding condition bit has been completed at the back end, an update message is sent from the back end to the front end of the processing pipeline.

10. The processing pipeline of claim 9, wherein said update message is adapted for setting a corresponding scoreboard bit to valid as soon as the respective condition bit has been set in accordance with the out-come of the compare instruction.

11. The processing pipeline of claim 1, wherein the back end further comprises a bank of predicate registers.

12. The processing pipeline of claim 11, wherein the predicated instructions further comprise address identifiers adapted for identifying one of the predicate registers.

13. The processing pipeline of claim 11, wherein with regard to the condition bits at the front end and the predicate registers at the back end, separate renaming policies are employed.

14. The processing pipeline of claim 1, wherein the back end is adapted for selectively carrying out a predicated instruction in dependence on at least one corresponding predicate bit being set or not.

15. The processing pipeline of claim 1, wherein the back end is adapted for checking a test condition of a predicated instruction against a condition code, and for selectively carrying out the predicated instruction in dependence on whether the condition code satisfies the test condition.

16. The processing pipeline of claim 1, wherein the pipeline is adapted for performing laned SIMD conditional execution.

17. The processing pipeline of claim 1, wherein the predicated instructions are adapted for operating on packed operands, the packed operands containing a plurality of packed objects in respective lanes.

18. The processing pipeline of claim 1, wherein the processing pipeline's back end is adapted for evaluating predicates of a predicated instruction for each lane of an operand, and for selectively carrying out the operation in dependence on at least one predicate bit for a respective lane being set or not.

19. The processing pipeline of claim 1, wherein the back end is adapted for checking a test condition of a predicated instruction against a condition code set for each lane of an operand, and for selectively carrying out the operation only in those lanes for which the condition code satisfies the test condition.

20. The processing pipeline of claim 1, wherein the pipeline is adapted for performing SIMD array execution.

21. A method for implementing conditional execution of instructions, the method comprising:
    resolving a conditional branch instruction at a front end of a processor pipeline by accessing condition bits stored in an array;
    indicating, with at least one scoreboard bit per condition bit, whether a condition bit is valid or whether a condition bit is in the process of being up-dated; and
    evaluating a predicate of a predicate instruction at a back end of the processor pipeline.

* * * * *